(12) United States Patent
Reams et al.

(10) Patent No.: US 11,518,828 B1
(45) Date of Patent: Dec. 6, 2022

(54) PROCESS FOR MAKING MACROMOLECULAR NETWORKS

(71) Applicant: Government of the United States, as represented by the Secretary of the Air Force, Wright-Patterson AFB, OH (US)

(72) Inventors: Josiah T. Reams, Torrance, CA (US); Andrew J. Guenthner, Berkeley, CA (US); Timothy S. Haddad, Lancaster, CA (US); Jacob C. Marcischak, Tehachapi, CA (US); Kamran B. Ghiassi, Palmdale, CA (US); Levi Michael Joseph Moore, Lancaster, CA (US)

(73) Assignee: United States of America as represented by the Secretary of the Air Force, Wright-Patterson AFB, OH (US)

(*) Notice: Subject to any disclaimer, the term of this patent is extended or adjusted under 35 U.S.C. 154(b) by 602 days.

(21) Appl. No.: 16/710,123

(22) Filed: Dec. 11, 2019

Related U.S. Application Data

(60) Provisional application No. 62/798,075, filed on Jan. 29, 2019.

(51) Int. Cl.
| | | |
|---|---|---|
| C08F 36/06 | (2006.01) | |
| C08K 5/14 | (2006.01) | |
| C08K 5/01 | (2006.01) | |
| C06B 23/00 | (2006.01) | |
| C08K 5/37 | (2006.01) | |
| C08K 5/18 | (2006.01) | |
| C08G 65/20 | (2006.01) | |

(52) U.S. Cl.
CPC ............ *C08F 36/06* (2013.01); *C06B 23/007* (2013.01); *C08G 65/20* (2013.01); *C08K 5/01* (2013.01); *C08K 5/14* (2013.01); *C08K 5/18* (2013.01); *C08K 5/37* (2013.01)

(58) Field of Classification Search
CPC ....... C08F 36/06; C06B 23/007; C08G 65/20; C08K 5/01; C08K 5/14; C08K 5/18; C08K 5/37
See application file for complete search history.

(56) References Cited

U.S. PATENT DOCUMENTS

| 3,400,091 A | 9/1968 | Stumpe |
| 3,609,181 A | 9/1971 | Lubowitz |
| 5,334,270 A | 8/1994 | Taylor |

OTHER PUBLICATIONS

Lowe, Andrew B. Thiol-ene "click" reactions and recent applications in polymer and materials synthesis. Polym. Chem. 2010, 1, 17-36.
Guang-Zhao Li, Rajan K. Randev, Alexander H. Soeriyadi, Gregory Rees, Cyrille Boyer, Zhen Tong, Thomas P. Davis, C. Remzi Becera and David M. Haddleton. Investigation into thiol-(meth)acrylate Michael addition reactions using amine and phosphine catalysts. Polym. Chem. 2010, 1, 1196-1204.
Devatha P. Nair, Maciej Podgórski, Shunsuke Chatani, Tao Gong, Weixian Xi, Christopher R. Fenoli, and Christopher N. Bowman. The Thiol-Michael Addition Click Reaction: A Powerful and Widely Used Tool in Materials Chemistry. Chem. Mater. 2014, 26, 724-744.
Elizabeth L. Tyson, Zachary L. Niemeyer, and Tehshik P. Yoon. Redox Mediators in Visible Light Photocatalysis: Photocatalytic Radical Thiol-Ene Additions. J.Org. Chem. 2014, 79, 1427-1436.
Weixian Xi, Chen Wang, Christopher J. Kloxin, and Christopher N. Bowman Nitrogen-Centered Nucleophile Catalyzed Thiol-Vinylsulfone Addition, Another Thiol-ene "Click" Reaction. ACS Macro Lett. 2012, 1, 811-814.
Jiangtao Xu and Cyrille Boyer. Visible Light Photocatalytic Thiol-Ene Reaction: An Elegant Approach for Fast Polymer Postfunctionalization and Step-Growth Polymerization. Macromolecules 2015, 48, 520-529.
USM Procedures e-mailed by Jacob C. Marcischak on Jan. 29, 2018, to Dr. Derek Patton.
E-mail from Dr. Derek Patton confirming that he was not aware of the USM Procedures e-mailed by Jacob C. Marcischak on Jan. 29, 2018, to him until Feb. 1, 2018.

*Primary Examiner* — Angela C Scott
(74) *Attorney, Agent, or Firm* — AFMCLO/JAZ; James F. McBride

(57) ABSTRACT

The present invention relates to processes for making macromolecular networks, macromolecular networks made by such processes, and methods of using such macromolecular networks. Such process employs a low amount of amine compound as a reaction accelerant. The rates of chemical reaction are thereby easily controlled over several orders of magnitude, permitting efficient catalysis and control of reaction conditions needed to produce thermochemically stable macromolecular networks.

14 Claims, No Drawings

PROCESS FOR MAKING MACROMOLECULAR NETWORKS

CROSS-REFERENCE TO RELATED APPLICATION

The present application claims priority to U.S. Provisional Application Ser. No. 62/798,075 filed Jan. 29, 2019, the contents of which is hereby incorporated by reference in their entry.

RIGHTS OF THE GOVERNMENT

The invention described herein may be manufactured and used by or for the Government of the United States for all governmental purposes without the payment of any royalty.

FIELD OF THE INVENTION

The present invention relates to processes for making macromolecular networks, macromolecular networks made by such processes, and methods of using such macromolecular networks.

BACKGROUND OF THE INVENTION

Macromolecular networks, for example elastomers, are produced by a number of processes including click reactions. In general, click reactions, one of which is the thiol-ene (also known as alkene hydrothiolation) reaction, display several attractive characteristics. They are relatively fast reactions, they produce reaction products in high yields with high purity, they are insensitive to residual oxygen and moisture from ambient conditions, they proceed via a single reaction pathway, and they are typically orthogonal. However, in the case of the thiol-ene reaction, when the reactive functional groups are relatively dilute, the yields and specificity of the reaction is hindered. When one of the reactive moieties of a thiol-ene reaction system is a telechelic oligomer, the reaction is inherently dilute even when performed neat in the absence of solvent and low yields, and in some cases side reactions, are obtained. As a result, the finished macromolecular networks are not as thermochemically stable as desired.

Applicants recognized that the source of the aforementioned problems was the speed at which the curing reaction occurred. Applicants discovered that the reaction speed could be accelerated by introducing a low amount of a material that comprise an amine moiety into the reaction mixture. In addition, rates of chemical reaction are easily controlled over several orders of magnitude, permitting efficient catalysis and control of reaction conditions needed to produce macromolecular networks. Thus, Applicants disclose a process of producing a macromolecular network that employs a low amount of amine compound as a reaction accelerant. These materials are important for potential replacements of state of the art solid rocket propellant binders due to their greater hydrolytic and long term oxidative stability. The cure times of these systems are tunable and therefore adaptable to a wide range of processing parameters and are therefore amenable to current SOTA processing techniques

SUMMARY OF THE INVENTION

The present invention relates to processes for making macromolecular networks, macromolecular networks made by such processes, and methods of using such macromolecular networks. Such process employs a low amount of amine compound as a reaction accelerant. The rates of chemical reaction are thereby easily controlled over several orders of magnitude, permitting efficient catalysis and control of reaction conditions needed to produce thermochemically-stable macromolecular networks.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Definitions

Unless specifically stated otherwise, as used herein, the terms "a", "an" and "the" mean "at least one".

As used herein, the terms "include", "includes" and "including" are meant to be non-limiting.

Unless otherwise noted, all component or composition levels are in reference to the active portion of that component or composition, and are exclusive of impurities, for example, residual solvents or by-products, which may be present in commercially available sources of such components or compositions.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Processes of Making Macromolecular Networks

For purposes of this specification, headings are not considered paragraphs and thus this paragraph is Paragraph 0013 of the present specification. The individual number of each paragraph above and below this paragraph can be determined by reference to this paragraph's number. In this Paragraph 0013, Applicants disclose a process of making a macromolecular network said process comprising curing, via heating, a curative composition selected from the group consisting of:

a) Curative Composition 1, said Curative Composition 1 comprising:
   (i) a telechelic oligomer comprising a backbone, chain ends and at least two reactive groups, each of said reactive groups being independently selected from carbon-carbon double bonds or carbon-carbon triple bonds, preferably said telechelic oligomer comprises from 2 to 4 reactive groups, more preferably said telechelic oligomer comprises from 2 reactive groups, preferably said reactive groups are on said chain ends, preferably said reactive groups are vinylethers;

(ii) a thiol tri- or tetrafunctionalized crosslinking agent;
(iii) an optional dithiol chain extender
(iv) a free radical initiator; and
(v) based on total Curative Composition 1's weight, from about 0.1 wt % to about 10 wt %, preferably from about 0.1 wt % to about 1 wt %, more preferably from about 0.1 wt % to about 0.5 wt %, most preferably from about 0.3 wt % to about 0.5 wt % of an accelerator comprising an amine moiety; or based on total Curative Composition 1's weight, from about 0.01 wt % to about 10 wt %, preferably from about 0.02 wt % to about 1 wt %, more preferably from about 0.03 wt % to about 0.2 wt %, most preferably from about 0.05 wt % to about 0.1 wt % of an accelerator comprising an amine moiety;
b) Curative Composition 2, said Curative Composition 2 comprising:
(i) a telechelic oligomer comprising at least 2 reactive groups, each of said reactive groups being thiol functionalized, preferably said oligomer comprises from 2 to 4 reactive groups, more preferably said oligomer comprises 2 reactive groups preferably said reactive groups are on the chain ends;
(ii) a tri- or tetrafunctionalized crosslinking agent comprising one or more carbon-carbon double bonds and/or; carbon-carbon triple bonds that provide said functionalization;
(iii) an optional difunctional chain extender comprising one or more carbon-carbon double bonds and/or; carbon-carbon triple bonds that provide said functionalization;
(iv) a free radical initiator; and
(v) based on total Curative Composition 2's weight, from about 0.0110 wt % to about 10 wt %, preferably from about 0.02 wt % to about 1 wt %, more preferably from about 0.03 wt % to about 0.2 wt %, most preferably from about 0.05 wt % to about 0.1 wt % of an accelerator comprising an amine moiety;
c) mixtures thereof.

Compounds called alkenes are known to contain carbon-carbon double bonds while compounds called alkynes are known to contain carbon-carbon triple bonds. Thiol-ene reactions are also called alkene hydrothiolation reactions while thiol-yne reactions are also known as alkyne hydrothiolation reactions.

Applicants disclose a process according to Paragraph 0013, wherein:
a) for Curative Composition 1,
(i) said telechelic oligomer's backbone is selected from the group consisting of hydrogenated polybutadiene, polybutadiene, polyethylene glycol, polytetrahydrofuran, polycaprolactam, polycaprolactone, preferably said telechelic oligomer's backbone is selected from the group consisting of hydrogenated polybutadiene or polytetrahydrofuran and mixtures thereof;
(ii) said thiol tri- or tetrafunctionalized crosslinking agent is selected from the group consisting of cyclohexanetriethylthiols, pentaerythrityl tetrathiol, 1,1,1-tris(mercaptomethyl)ethane and mixtures thereof, preferably said thiol functionalized crosslinking agent is selected from the group consisting of 1,2,4-cyclohexanetriethylthiol, pentaerythrityl tetrathiol and mixtures thereof;
(iii) said dithiol chain extender is selected from the group consisting of alkyldithiols, 3,6-dioxa-1,8-octanedithiol and mixtures thereof, preferably said thiol functionalized crosslinking agent is selected from the group consisting of nonanedithiol, 3,6-dioxa-1,8-octanedithiol and mixtures thereof;
(iv) said accelerator comprising an amine moiety is selected from the group consisting of N-phenyl-2-naphthylamine, aniline, p-anisidine, 1,2,3,4-tetrahydroquinoline, p-aminophenol, N,N-dimethylaniline, p-bromoaniline, p-nitroaniline, diphenylamine, 4-aminopyridine, anisole, 1,4-phenylenediamine and mixtures thereof, preferably said accelerator comprising an amine moiety is selected from the group consisting of N-phenyl-2-naphthylamine or p-anisidine, or diphenylamine and mixtures thereof; more preferably said accelerator comprising an amine moiety is selected from the group consisting of N-phenyl-2-naphthylamine or p-anisidine, and mixtures thereof; and
(v) said free radical initiator is selected from the group consisting of t-butylperoxy-2-ethylhexyl carbonate are lauroyl peroxide, t-butyl peroxybenzoate, di-tert-butyl peroxide, benzoyl peroxide, dicumyl peroxide or azobisisobutyronitrile and mixtures thereof, preferably said free radical initiator is selected from the group consisting of t-butylperoxy 2-ethylhexyl carbonate or lauroyl peroxide and mixtures thereof;
b) for Curative Composition 2,
(i) said telechelic oligomer's backbone is selected from the group consisting of hydrogenated polybutadiene, polybutadiene, polyethylene glycol, polytetrahydrofuran, polycaprolactam, polycaprolactone and mixtures thereof, preferably said telechelic oligomer's backbone is selected from the group consisting of hydrogenated polybutadiene, polytetrahydrofuran and mixtures thereof;
(ii) said tri- or tetrafunctionalized crosslinking agent comprises one or more hydrocarbons comprising three or four unsaturated terminal sites, preferably said trifunctionalized crosslinking agent comprises 1,2,4-trivinylcyclohexane and said tetrafunctionalized crosslinking agent comprises tetravinylmethane;
(iii) said difunctional chain extender comprises alpha-omega di-unsaturated hydrocarbon, preferably 1,7-octadiene;
(iv) said accelerator comprising an amine moiety is selected from the group consisting of N-phenyl-2-naphthylamine, aniline, p-anisidine, 1,2,3,4-tetrahydroquinoline, p-aminophenol, N,N-dimethylaniline, p-bromoaniline, p-nitroaniline, diphenylamine, 4-aminopyridine, anisole, 1,4-phenylenediamine and mixtures thereof, preferably said accelerator comprising an amine moiety is selected from the group consisting of N-phenyl-2-naphthylamine, p-anisidine, or diphenylamine and mixtures thereof; more preferably said accelerator comprising an amine moiety is selected from the group consisting of N-phenyl-2-naphthylamine, p-anisidine, and mixtures thereof; and
(v) said free radical initiator is selected from the group consisting of t-butylperoxy 2-ethylhexyl carbonate, lauroyl peroxide, t-butyl peroxybenzoate, di-tert-butyl peroxide, benzoyl peroxide, dicumyl peroxide, azobisisobutyronitrile and mixtures thereof, preferably said free radical initiator is selected from the group consisting of t-butylperoxy 2-ethylhexyl carbonate, lauroyl peroxide and mixtures thereof.

Applicants disclose a process according to according to Paragraphs 0013 thru 0014 wherein:
a) for Curative Composition 1,
(i) said telechelic oligomer is present, based on total curative composition weight, at a level of from about 50 wt % to about 99 wt %, preferably from about 88 wt % to about 99 wt %, more preferably from about 89 wt % to about 94 wt %, most preferably from about 90 wt % to about 93 wt %;
(ii) said thiol tri- or tetrafunctionalized crosslinking agent is present, based on total curative composition weight, at a level of from about 0.5 wt % to about 10 wt %, preferably from about 0.5 wt % to about 7 wt %, more preferably from about 1 wt % to about 6 wt %, most preferably from about 2.0 wt % to about 5.5 wt %;
(iii) said dithiol chain extender is present, based on total curative composition weight, at a level of from 0 wt % to about 10 wt %, preferably from about 0 wt % to about 5 wt %, more preferably from about 0 wt % to about 4 wt %, most preferably from about 0 wt % to about 3.5 wt %;
(iv) said free radical initiator is present, based on total curative composition weight, at a level of from about 0.1 wt % to about 10 wt %, preferably from about 0.5 wt % to about 8 wt %, more preferably from about 1 wt % to about 5 wt %, most preferably from about 2 wt % to about 4 wt %; and
(v) said accelerator comprising an amine moiety is present, based on total curative composition weight, at a level of from about 0.1 wt % to about 10 wt %, preferably from about 0.1 wt % to about 1 wt %, more preferably from about 0.1 wt % to about 0.5 wt %, most preferably from about 0.3 wt % to about 0.5 wt %;
alternatively
(i) said telechelic oligomer is present, based on total curative composition weight, at a level of from about 50 wt % to about 99 wt %, preferably from about 90 wt % to about 99 wt %, more preferably from about 92 wt % to about 96 wt %, most preferably from about 93 wt % to about 95 wt %;
(ii) said thiol tri- or tetrafunctionalized crosslinking agent is present, based on total curative composition weight, at a level of from about 0.5 wt % to about 10 wt %, preferably from about 0.5 wt % to about 5 wt %, more preferably from about 0.5 wt % to about 2 wt %, most preferably from about 1.0 wt % to about 1.2 wt %;
(iii) said dithiol chain extender is present, based on total curative composition weight, at a level of from about 0.5 wt % to about 40 wt %, preferably from about 0.5 wt % to about 20 wt %, more preferably from about 0.5 wt % to about 10 wt %, most preferably from about 4.4 wt % to about 4.7 wt %; and
(iv) said free radical initiator is present, based on total curative composition weight, at a level of from about 0.1 wt % to about 10 wt %, preferably from about 0.1 wt % to about 1 wt %, more preferably from about 0.1 wt % to about 0.5 wt %, most preferably from about 0.3 wt % to about 0.5 wt %; and
b) for Curative Composition 2,
(i) said telechelic oligomer is present, based on total curative composition weight, at a level of from about 50 wt % to about 99 wt %, preferably from about 90 wt % to about 99 wt %, more preferably from about 92 wt % to about 96 wt %, most preferably from about 93 wt % to about 95 wt %;
(ii) said tri- or tetrafunctionalized crosslinking agent is present, based on total curative composition weight, at a level of from about 0.5 wt % to about 10 wt %, preferably from about 0.5 wt % to about 5 wt %, more preferably from about 0.5 wt % to about 2 wt %, most preferably from about 1 wt % to about 1.2 wt %;
(iii) said difunctional chain extender agent is present, based on total curative composition weight, at a level of from about 0.5 wt % to about 40 wt %, preferably from about 0.5 wt % to about 20 wt %, more preferably from about 0.5 wt % to about 10 wt %, most preferably from about 4.4 wt % to about 4.7 wt %; and
(iv) said free radical initiator is present, based on total curative composition weight, at a level of from about 0.1 wt % to about 10 wt %, preferably from about 0.1 wt % to about 1 wt %, more preferably from about 0.1 wt % to about 0.5 wt %, most preferably from about 0.3 wt % to about 0.5 wt %.

Applicants disclose a process according to Paragraphs 0013 through-0015 wherein said curing via heating comprises heating said Curative Composition 1 and/or Curative Composition 2 from about 25° C. to about 150° C. Said heating time can range from seconds to days. In one aspect, a preferred temperature is about 60° C. and a preferred time is about seven days. As will approached by skilled artisan the heating temperature and/or time is a function of initiator type and concentration as well accelerator type and concentration. As either material's concentration is increased, the curing temperature and time may decrease.

Applicants disclose a process according to Paragraphs 0013 through 0016 wherein said curing via heating comprises heating in a controlled temperature environment, preferably in a Vacuum Oven, for example an Isotemp Vacuum Oven.

The resulting crosslinked rubber is useful as a sealant, for example a window sealant, binder material for solid a solid rocket motor. Detailed methods of using a crosslinked rubber are found in U.S. Pat. No. 3,609,181 A wherein polyTHF is used as a binder material; U.S. Pat. No. 5,334,270 A wherein polybutadiene is used as a binder material; and U.S. Pat. No. 3,400,091 A wherein polybutadiene is used as a sealant.

The order of addition of reagents may impact the cure of these materials and best results are obtained with materials that are well-mixed. Because the cure is initiated with the reaction of free radicals with a thiol functionality, the temperature of mixing, the nature of the free-radical initiator (peroxide) and the reactivity of the accelerant (amine) all have a role. When using a material with a long cure time (days) success is achieved by first combining the telechelic polymer with the peroxide initiator. A separate mixture of amine accelerant, crosslinking agent, and chain extender is produced. Then these two mixtures are combined to make a final material which cures to a solid rubber over time. Alternative approaches to the order of addition may be reasonable.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Example 1. Vinyl ether terminated hydrogenated polybutadiene (2.25 g, 0.752 mmol) of number average molecular weight of 3000 g/mol, is mixed with N-phenyl-2-naphthylamine (0.002 g, 0.009 mmol) in a six-axis speed mixer for 120 seconds at 2300 rpm. To this mixture, tert-butylperoxy-2-ethylhexyl carbonate (0.011 g, 0.045 mmol) is added and mixed (120 seconds at 2300 rpm) followed by a pre-mixed mixture of pentaerythrityl tetrathiol (0.027 g, 0.13 mmol) and 1,9-nonanedithiol (0.11 g, 0.55 mmol) and then mixed 120 seconds at 2300 rpm. The mixture is then heated for 7-14 days at 70° C. After 14 days a macromolecular network is obtained having the following properties: Shore A hardness 73, Modulus 158 psi, Creep 0.025%. This data demonstrates that a crosslinked rubber was obtained.

Example 2. Vinyl ether terminated hydrogenated polybutadiene (2.45 g, 0.815 mmol) of number average molecular weight of 3000 g/mol, is mixed with N-phenyl-2-naphthylamine (0.002 g, 0.009 mmol) in a six-axis speed mixer for 120 seconds at 2300 rpm. To this mixture, tert-butylperoxy-2-ethylhexyl carbonate (0.012 g, 0.049 mmol) is added and mixed (120 seconds at 2300 rpm) followed by a pre-mixed mixture of pentaerythrityl tetrathiol (0.036 g, 0.181 mmol) and 1,9-nonanedithiol (0.105 g, 0.521 mmol) and then mixed 120 seconds at 2300 rpm. The mixture is then heated for 7-14 days at 70° C. After 14 days a macromolecular network is obtained having the following properties: Shore A hardness 76, Modulus 189 psi, Creep 0.025%. This data demonstrates that a crosslinked rubber was obtained.

Example 3. Vinyl ether terminated hydrogenated polybutadiene (2.26 g, 0.753 mmol) of number average molecular weight of 3000 g/mol, is mixed with N-phenyl-2-naphthylamine (0.0017 g, 0.008 mmol) in a six-axis speed mixer for 120 seconds at 2300 rpm. To this mixture, tert-butylperoxy-2-ethylhexyl carbonate (0.0093 g, 0.038 mmol) is added and mixed (120 seconds at 2300 rpm) followed by a pre-mixed mixture of pentaerythrityl tetrathiol (0.034 g, 0.170 mmol) and 1,9-nonanedithiol (0.097 g, 0.484 mmol) and then mixed 120 seconds at 2300 rpm. The mixture is then heated for 7-14 days at 70° C. After 14 days a macromolecular network is obtained having the following properties: Shore A hardness 81, Modulus 172 psi, Creep 0.005%. This data demonstrates that a crosslinked rubber was obtained.

Example 4. Vinyl ether terminated hydrogenated polybutadiene (5.00 g, 1.67 mmol) of number average molecular weight of 3000 g/mol, is mixed with lauroyl peroxide (0.132 g, 0.333 mmol) in a six-axis speed mixer for 120 seconds at 2300 rpm. In a separate vial, N-phenyl-2-naphthylamine (0.0082 g, 0.0376 mmol) is dissolved in 1,2,4-cyclohexanetriethylthiol (0.2934 g, 1.11 mmol). The thiol/amine solution was added to the polymer/peroxide mixture and mixed for 120 seconds at 2300 rpm. The mixture is then heated for 7-14 days at 70° C. After 14 days a macromolecular network is obtained having the following properties: Modulus 88 psi, Creep 0.025%. This data demonstrates that a crosslinked rubber was obtained.

Example 5. Vinyl ether terminated hydrogenated polybutadiene (5.00 g, 1.67 mmol) of number average molecular weight of 3000 g/mol, is mixed with lauroyl peroxide (0.133 g, 0.333 mmol) in a six-axis speed mixer for 120 seconds at 2300 rpm. In a separate vial, N-phenyl-2-naphthylamine (0.0074 g, 0.0371 mmol) is dissolved in a mixture of 1,2,4-cyclohexanetriethylthiol (0.176 g, 0.665 mmol) and 3,6-dioxa-1,8-octanedithiol chain extender (0.122 g, 0.667 mmol). The thiol/amine solution was added to the polymer/peroxide mixture and mixed for 120 seconds at 2300 rpm. The mixture is then heated for 7-14 days at 70° C. After 14 days a macromolecular network is obtained having the following properties: Modulus 45 psi, Creep 0.80%. This data demonstrates that a crosslinked rubber was obtained.

Example 6. Vinyl ether terminated hydrogenated polybutadiene (5.00 g, 1.67 mmol) of number average molecular weight of 3000 g/mol, is mixed with lauroyl peroxide (0.200 g, 0.501 mmol) in a six-axis speed mixer for 120 seconds at 2300 rpm. In a separate vial, N-phenyl-2-naphthylamine (0.0111 g, 0.0508 mmol) is dissolved in a mixture of 1,2,4-cyclohexanetriethylthiol (0.129 g, 0.487 mmol) and 3,6-dioxa-1,8-octanedithiol chain extender (0.178 g, 0.974 mmol). The thiol/amine solution was added to the polymer/peroxide mixture and mixed for 120 seconds at 2300 rpm. The mixture is then heated for 7-14 days at 70° C. After 14 days a macromolecular network is obtained having the following properties: Modulus 38 psi, Creep 13.9%. This data demonstrates that a crosslinked rubber was obtained.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A process of making a macromolecular network said process comprising curing, via heating, a curative composition selected from the group consisting of:
    a) Curative Composition 1, said Curative Composition 1 comprising:
        (i) a telechelic oligomer comprising a backbone, chain ends and at least two reactive groups, each of said reactive groups being independently selected from carbon-carbon double bonds or carbon-carbon triple bonds;
        (ii) a thiol tri- or tetrafunctionalized crosslinking agent;
        (iii) an optional dithiol chain extender;
        (iv) a free radical initiator; and
        (v) based on total Curative Composition 1's weight, from about 0.1 wt % to about 10 wt % of an accelerator comprising an amine moiety;
    b) Curative Composition 2, said Curative Composition 2 comprising:
        (i) a telechelic oligomer comprising at least 2 reactive groups, each of said reactive groups being thiol functionalized;
        (ii) a tri- or tetrafunctionalized crosslinking agent comprising one or more carbon-carbon double bonds and/or carbon-carbon triple bonds that provide said functionalization;
        (iii) an optional difunctional chain extender comprising one or more carbon-carbon double bonds and/or carbon-carbon triple bonds that provide said functionalization;
        (iv) a free radical initiator; and
        (v) based on total Curative Composition 2's weight, from about 0.0110 wt % to about 10 wt % of an accelerator comprising an amine moiety; and
    c) mixtures thereof.

2. A process of making a macromolecular network according to claim 1, said process comprising curing, via heating, a curative composition selected from the group consisting of:
    a) Curative Composition 1, said Curative Composition 1 comprising:
        (i) a telechelic oligomer comprising a backbone, chain ends and from 2 to 4 reactive groups, each of said reactive groups being independently selected from carbon-carbon double bonds or carbon-carbon triple bonds;
        (ii) a thiol tri- or tetrafunctionalized crosslinking agent;

(iii) an optional dithiol chain extender;
(iv) a free radical initiator; and
(v) based on total Curative Composition 1's weight, from about 0.1 wt % to about 1 wt % of an accelerator comprising an amine moiety;
b) Curative Composition 2, said Curative Composition 2 comprising:
  (i) a telechelic oligomer comprising from 2 to 4 reactive groups, each of said reactive groups being thiol functionalized;
  (ii) a tri- or tetrafunctionalized crosslinking agent comprising one or more carbon-carbon double bonds and/or carbon-carbon triple bonds that provide said functionalization;
  (iii) an optional difunctional chain extender comprising one or more carbon-carbon double bonds and/or carbon-carbon triple bonds that provide said functionalization;
  (iv) a free radical initiator; and
  (v) based on total Curative Composition 2's weight, from about 0.02 wt % to about 1 wt % of an accelerator comprising an amine moiety; and
c) mixtures thereof.

3. A process of making a macromolecular according to claim 1 said process comprising curing, via heating, a curative composition selected from the group consisting of:
a) Curative Composition 1, said Curative Composition 1 comprising:
  (i) a telechelic oligomer comprising a backbone, chain ends and two reactive groups, each of said reactive groups being independently selected from carbon-carbon double bonds or carbon-carbon triple bonds;
  (ii) a thiol tri- or tetrafunctionalized crosslinking agent;
  (iii) an optional dithiol chain extender;
  (iv) a free radical initiator; and
  (v) based on total Curative Composition 1's weight from about 0.1 wt % to about 0.5 wt % of an accelerator comprising an amine moiety;
b) Curative Composition 2, said Curative Composition 2 comprising:
  (i) a telechelic oligomer comprising 2 reactive groups, each of said reactive groups being thiol functionalized;
  (ii) a tri- or tetrafunctionalized crosslinking agent comprising one or more carbon-carbon double bonds and/or carbon-carbon triple bonds that provide said functionalization;
  (iii) an optional difunctional chain extender comprising one or more carbon-carbon double bonds and/or carbon-carbon triple bonds that provide said functionalization;
  (iv) a free radical initiator; and
  (v) based on total Curative Composition 2's weight from about 0.03 wt % to about 0.2 wt % of an accelerator comprising an amine moiety; and
c) mixtures thereof.

4. A process of making a macromolecular network according to claim 1, said process comprising curing, via heating, a curative composition selected from the group consisting of:
a) Curative Composition 1, said Curative Composition 1 comprising:
  (i) a telechelic oligomer comprising a backbone, chain ends and two reactive groups, each of said reactive groups being independently selected from carbon-carbon double bonds or carbon-carbon triple bonds, said reactive groups being on said chain ends;
  (ii) a thiol tri- or tetrafunctionalized crosslinking agent;
  (iii) an optional dithiol chain extender;
  (iv) a free radical initiator; and
  (v) based on total Curative Composition 1's weight, from about 0.3 wt % to about 0.5 wt % of an accelerator comprising an amine moiety;
b) Curative Composition 2, said Curative Composition 2 comprising:
  (i) a telechelic oligomer comprising 2 reactive groups, each of said reactive groups being thiol functionalized, said reactive groups being on the chain ends;
  (ii) a tri- or tetrafunctionalized crosslinking agent comprising one or more carbon-carbon double bonds and/or carbon-carbon triple bonds that provide said functionalization;
  (iii) an optional difunctional chain extender comprising one or more carbon-carbon double bonds and/or carbon-carbon triple bonds that provide said functionalization;
  (iv) a free radical initiator; and
  (v) based on total Curative Composition 2's weight, from about 0.05 wt % to about 0.1 wt % of an accelerator comprising an amine moiety; and
c) mixtures thereof.

5. A process of making a macromolecular network according to claim 4, wherein for Curative Composition 1's telechelic oligomer, said reactive groups are vinylethers.

6. A process according to claim 1, wherein:
a) for Curative Composition 1,
  (i) said telechelic oligomer's backbone is selected from the group consisting of hydrogenated polybutadiene, polybutadiene, polyethylene glycol, polytetrahydrofuran, polycaprolactam, polycaprolactone and mixtures thereof;
  (ii) said thiol tri- or tetrafunctionalized crosslinking agent is selected from the group consisting of cyclohexanetriethylthiols, pentaerythrityl tetrathiol, 1,1,1-tris(mercaptomethyl)ethane and mixtures thereof;
  (iii) said dithiol chain extender is selected from the group consisting of alkyldithiols, 3,6-dioxa-1,8-octanedithiol and mixtures thereof;
  (iv) said accelerator comprising an amine moiety is selected from the group consisting of N-phenyl-2-naphthylamine, aniline, p-anisidine, 1,2,3,4-tetrahydroquinoline, p-aminophenol, N,N-dimethylaniline, p-bromoaniline, p-nitroaniline, diphenylamine, 4-aminopyridine, anisole, 1,4-phenylenediamine and mixtures thereof; and
  (v) said free radical initiator is selected from the group consisting of t-butylperoxy 2-ethylhexyl carbonate are lauroyl peroxide, t-butyl peroxybenzoate, di-tert-butyl peroxide, benzoyl peroxide, dicumyl peroxide or azobisisobutyronitrile and mixtures thereof;
b) for Curative Composition 2,
  (i) said telechelic oligomer's backbone is selected from the group consisting of hydrogenated polybutadiene, polybutadiene, polyethylene glycol, polytetrahydrofuran, polycaprolactam, polycaprolactone, mixtures thereof;
  (ii) said tri- or tetrafunctionalized crosslinking agent comprises one or more hydrocarbons comprising three or four unsaturated terminal sites;
  (iii) said difunctional chain extender comprises alpha-omega di-unsaturated hydrocarbon;
  (iv) said accelerator comprising an amine moiety is selected from the group consisting of N-phenyl-2-naphthylamine, aniline, p-anisidine, 1,2,3,4-tetrahydroquinoline, p-aminophenol, N,N-dimethylaniline, p-bromoaniline, p-nitroaniline, diphenylamine, 4-aminopyridine, anisole, 1,4-phenylenediamine and mixtures thereof; and
(v) said free radical initiator is selected from the group consisting of t-butylperoxy 2-ethylhexyl carbonate, lauroyl peroxide, t-butyl peroxybenzoate, di-tert-butyl peroxide, benzoyl peroxide, dicumyl peroxide, azobisisobutyronitrile and mixtures thereof.

7. A process according to claim 6, wherein:
a) for Curative Composition 1,
(i) said telechelic oligomer's backbone is selected from the group consisting of hydrogenated polybutadiene or polytetrahydrofuran and mixtures thereof;
(ii) said thiol functionalized crosslinking agent is selected from the group consisting of 1,2,4-cyclohexanetriethylthiol, pentaerythrityl tetrathiol and mixtures thereof;
(iii) said dithiol chain extender said is selected from the group consisting of nonanedithiol, 3,6-dioxa-1,8-octanedithiol and mixtures thereof;
(iv) said accelerator comprising an amine moiety is selected from the group consisting of N-phenyl-2-naphthylamine or p-anisidine, or diphenylamine and mixtures thereof; and
(v) said free radical initiator is selected from the group consisting of t-butylperoxy 2-ethylhexyl carbonate, lauroyl peroxide and mixtures thereof;
b) for Curative Composition 2,
(i) said telechelic oligomer's backbone is selected from the group consisting of hydrogenated polybutadiene, polytetrahydrofuran and mixtures thereof;
(ii) said trifunctionalized crosslinking agent comprises 1,2,4-trivinylcyclohexane and said tetrafunctionalized crosslinking agent comprises tetravinylmethane;
(iii) said difunctional chain extender comprises 1,7-octadiene;
(iv) said accelerator comprising an amine moiety is selected from the group consisting of N-phenyl-2-naphthylamine, p-anisidine, or diphenylamine and mixtures thereof; and
(v) said free radical initiator is selected from the group consisting of t-butylperoxy 2-ethylhexyl carbonate, lauroyl peroxide and mixtures thereof.

8. A process according to claim 7, wherein for Curative Composition 1 and Curative Composition 2, said accelerator comprising an amine moiety is selected from the group consisting of N-phenyl-2-naphthylamine, p-anisidine, and mixtures thereof.

9. The process to according to claim 1 wherein:
a) for Curative Composition 1,
(i) said telechelic oligomer is present, based on total curative composition weight, at a level of from about 50 wt % to about 99 wt %;
(ii) said thiol tri- or tetrafunctionalized crosslinking agent is present, based on total curative composition weight, at a level of from about 0.5 wt % to about 10 wt %;
(iii) said dithiol chain extender is present, based on total curative composition weight, at a level of from 0 wt % to about 10 wt %;
(iv) said free radical initiator is present, based on total curative composition weight, at a level of from about 0.1 wt % to about 10 wt %; and
(v) said accelerator comprising an amine moiety is present, based on total curative composition weight, at a level of from about 0.1 wt % to about 10 wt %; and
b) for Curative Composition 2,
(i) said telechelic oligomer is present, based on total curative composition weight, at a level of from about 50 wt % to about 99 wt %;
(ii) said tri- or tetrafunctionalized crosslinking agent is present, based on total curative composition weight, at a level of from about 0.5 wt % to about 10 wt %;
(iii) said difunctional chain extender agent is present, based on total curative composition weight, at a level of from about 0.5 wt % to about 40 wt %; and
(iv) said free radical initiator is present, based on total curative composition weight, at a level of from about 0.1 wt % to about 10 wt %.

10. The process to according to claim 1 wherein:
a) for Curative Composition 1,
(i) said telechelic oligomer is present, based on total curative composition weight, at a level of from about 88 wt % to about 99 wt %;
(ii) said thiol tri- or tetrafunctionalized crosslinking agent is present, based on total curative composition weight, at a level of from about 0.5 wt % to about 7 wt %;
(iii) said dithiol chain extender is present, based on total curative composition weight, at a level of from about 0 wt % to about 5 wt %;
(iv) said free radical initiator is present, based on total curative composition weight, at a level of from about 0.5 wt % to about 8 wt %; and
(v) said accelerator comprising an amine moiety is present, based on total curative composition weight, at a level of from about 0.1 wt % to about 1 wt %; and
b) for Curative Composition 2,
(i) said telechelic oligomer is present, based on total curative composition weight, at a level of from about 90 wt % to about 99 wt %;
(ii) said tri- or tetrafunctionalized crosslinking agent is present, based on total curative composition weight, at a level of from about 0.5 wt % to about 5 wt %;
(iii) said difunctional chain extender agent is present, based on total curative composition weight, at a level of from about 0.5 wt % to about 20 wt %; and
(iv) said free radical initiator is present, based on total curative composition weight, at a level of from about 0.1 wt % to about 1 wt %.

11. The process to according to claim 1 wherein:
a) for Curative Composition 1,
(i) said telechelic oligomer is present, based on total curative composition weight, at a level of from about 89 wt % to about 94 wt %;
(ii) said thiol tri- or tetrafunctionalized crosslinking agent is present, based on total curative composition weight, at a level of from about 1 wt % to about 6 wt %;
(iii) said dithiol chain extender is present, based on total curative composition weight, at a level of from about 0 wt % to about 4 wt %;
(iv) said free radical initiator is present, based on total curative composition weight, at a level of from about 1 wt % to about 5 wt %; and (v) said accelerator comprising an amine moiety is present, based on total curative composition weight, at a level of from about 0.1 wt % to about 0.5 wt %; and b) for Curative Composition 2,
   (i) said telechelic oligomer is present, based on total curative composition weight, at a level of from about 92 wt % to about 96 wt %;
   (ii) said tri- or tetrafunctionalized crosslinking agent is present, based on total curative composition weight, at a level of from about 0.5 wt % to about 2 wt %;
   (iii) said difunctional chain extender agent is present, based on total curative composition weight, at a level of from about 0.5 wt % to about 10 wt %; and
   (iv) said free radical initiator is present, based on total curative composition weight, at a level of from about 0.1 wt % to about 0.5 wt %.

12. The process to according to claim 1 wherein:
a) for Curative Composition 1,
   (i) said telechelic oligomer is present, based on total curative composition weight, at a level of from about 90 wt % to about 93 wt %;
   (ii) said thiol tri- or tetrafunctionalized crosslinking agent is present, based on total curative composition weight, at a level of from about 2.0 wt % to about 5.5 wt %;
   (iii) said dithiol chain extender is present, based on total curative composition weight, at a level of from about 0 wt % to about 3.5 wt %;
   (iv) said free radical initiator is present, based on total curative composition weight, at a level of from about 2 wt % to about 4 wt %; and
   (v) said accelerator comprising an amine moiety is present, based on total curative composition weight, at a level of from about 0.3 wt % to about 0.5 wt %; and b) for Curative Composition 2,
   (i) said telechelic oligomer is present, based on total curative composition weight, at a level of from about 93 wt % to about 95 wt %;
   (ii) said tri- or tetrafunctionalized crosslinking agent is present, based on total curative composition weight, at a level of from about 1 wt % to about 1.2 wt %;
   (iii) said difunctional chain extender agent is present, based on total curative composition weight, at a level of from about 4.4 wt % to about 4.7 wt %; and
   (iv) said free radical initiator is present, based on total curative composition weight, at a level of from about 0.3 wt % to about 0.5 wt %.

13. The process according to claim 1 wherein said curing via heating comprises heating said Curative Composition 1 and/or Curative Composition 2 from about 25° C. to about 150° C.

14. The process according to claim 13 wherein said curing via heating comprises heating in a controlled temperature environment.

\* \* \* \* \*